United States Patent [19]

Feldman

[11] 4,021,923

[45] May 10, 1977

[54] METRIC UNIT CONVERSION AID

[76] Inventor: Devora Feldman, 245 Balclutha, Corte Madera, Calif. 94925

[22] Filed: Jan. 14, 1976

[21] Appl. No.: 648,956

[52] U.S. Cl. ................................ 33/1 B; 33/174 B; 35/31 R

[51] Int. Cl.² ..................... G09B 19/02; G06G 1/00

[58] Field of Search ................. 33/1 B, 1 C, 174 B, 33/6; 35/31 E, 31 R, 33

[56] References Cited

UNITED STATES PATENTS

| | | | |
|---|---|---|---|
| 808,511 | 12/1905 | Cochran | 33/174 B |
| 1,662,882 | 3/1928 | Clark | 33/174 B |
| 3,564,718 | 2/1971 | Goode | 33/1 B |
| 3,787,988 | 1/1974 | Nakajima | 35/31 R |

FOREIGN PATENTS OR APPLICATIONS

| | | | |
|---|---|---|---|
| 587,220 | 4/1947 | United Kingdom | 35/33 |

*Primary Examiner*—Richard E. Aegerter
*Assistant Examiner*—John W. Shepperd

[57] ABSTRACT

A template incorporating a plurality of openings forming columns and rows having a predetermined alignment and identified by annotations representing metric system units to facilitate use of the device for automatic unit conversion during the performance of mathematical calculations involving dissimilar metric unit quantities.

3 Claims, 1 Drawing Figure

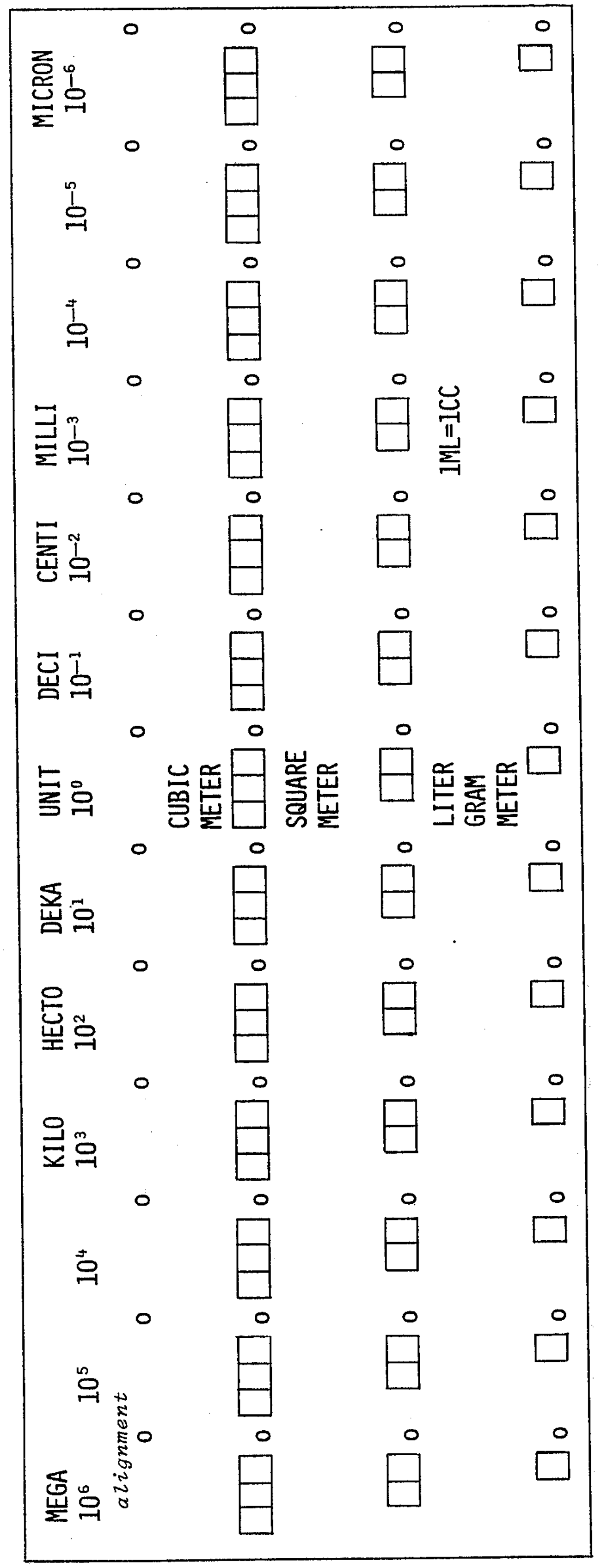
MEGA
10^6
alignment
10^5
10^4
KILO
10^3
HECTO
10^2
DEKA
10^1
UNIT
10^0
DECI
10^-1
CENTI
10^-2
MILLI
10^-3
10^-4
10^-5
MICRON
10^-6
CUBIC
METER
SQUARE
METER
LITER
GRAM
METER
1ML=1CC

METRIC UNIT CONVERSION AID

BACKGROUND AND OBJECTS OF THE INVENTION

The present invention relates to a template including a plurality of openings therein adapted to permit the user to carry out mathematical procedures involving quantities of similar and different units so that the final results will automatically be of the appropriate unit.

One of the primary concepts that has permitted man to grow intellectually from the dawn of time has been the concept of a standard measure, without which even the most simple bartering is impossible. Many different types of units have been used throughout recorded history and the earliest have gradually been replaced by more sophisticated systems to meet increasing demands necessitated by man's advancement. Today, our common units of measure have evolved into two basic systems, the metric system and the English system.

In many scientific fields, the metric system has been adopted universally and over the years there has been an increasing trend to replace the English system with the metric system in all areas so that the world will have a truly universal system of units and measurements.

The move for a complete conversion to the metric system is rapidly advancing in the United States and in the not distant future, the metric system will be the law of the land and the world. This will and is creating serious problems for numerous people who are unaccustomed to the metric system of units. Therefore, a primary objective of the invention presented by this patent is to enable individuals unfamiliar with the various units used in the metric system and their interrelationship to accomplish a variety of mathematical manipulations in such a way that they need not be concerned with the various unit interrelations and their results will be in the proper denomination and unit.

A further object of this invention is to provide a clear plastic template incorporating a plurality of openings through which numbers may be written in predetermined areas calculated so that a series of numbers may be written and when the template is removed, the decimal point will be properly located.

A still further objective of the present invention is to provide a relatively inexpensive calculator for metric unit conversion.

The foregoing and other objectives of the invention will become obvious when one considers the following specification and drawing wherein:

DESCRIPTION OF THE DRAWING

The illustration is a plane view of a metric system unit conversion template of the instant invention.

SUMMARY OF THE INVENTION

The invention described and defined herein is a template incorporating a plurality of openings arranged in columns and rows having a predetermined interrelationship. The columns and rows are anotated with relevant metric system unit data calculated to enable the user of the device to write metric system related numbers through the openings in the template and position the decimal point so that the numbers will automatically be converted to the proper metric system unit.

DESCRIPTION OF THE PREFERRED EMBODIMENT

A preferred embodiment of this invention is comprised of a rectangular piece of clear plastic annotated as illustrated in the figure and having openings substantially as illustrated in the figure and having openings substantially as illustrated through which numbers and decimal points may be written onto an underlying surface.

The template, whether it be made of clear plastic or other materials, incorporates a center column of three horizontal rows of openings. The first horizontal row includes three rectangular openings followed by a circular opening. This column is headed by the annotations UNIT, $10^0$, and CUBIC METER. The second row of the column consists of two rectangular openings followed by a circular opening and is preceded by the annotation SQUARE METER. The third horizontal row of the center column consists of a single rectangular opening and a circular opening preceded by the annotations LITER, GRAM and METER.

Six columns of horizontal rows of openings identical to the horizontal rows of openings in the center column are provided to the left and to the right of the center column. These additional twelve columns are distinguishable from the center column in that they do not contain the same annotations, although they do contain openings of the same dimensions, number and position.

As can be seen in the illustration, the extreme left hand column is annotated MEGA $10^6$, the second column $10^5$, the third column $10^4$, the fourth column KILO $10^3$, the fifth column HECTO $10^2$ and the sixth column DEKA $10^1$. The seventh column is the center column and is annotated as previously described. The eighth column is annotated DECI $10^{-1}$, the ninth column CENTI $10^{-2}$, the tenth column MILLI $10^{-3}$, the eleventh column $10^{-4}$, the twelvth column $10^{-5}$ and the thirteenth column MICRON $10^{-6}$.

The preferred embodiment of the instant invention is capable of assisting an operator to change from any metric unit to another metric unit, add mixed units and subtract mixed units.

To utilize the instant invention to convert metric units to different units, the device is placed on paper or other writing surface and the units are written in the appropriate row, one digit to an opening so that the decimal is placed in the circle in the column for that unit. Next, a second decimal is placed in the same row in the circle in the column of the unit to which conversion is desired. Zeros are then entered in all the empty openings, excluding the decimal point circles, in the horizontal row between the last digit written and the new decimal point. The template is then removed and the first written decimal point eliminated to complete the conversion.

For instance, to convert 35 meters to centimeters the operator would place his decimal point in the decimal point opening of the center column bottom row, the bottom row being annotated for meter calculations. Next, the number 35 is written to the left of the decimal point in the available open rectangles. This places a 3 in the deka column and a 5 in the unit column. The user would now find the column titled centi for centimeters or $10^{-2}$ and place a decimal point in the bottom row of that column. Zeros are then entered in the available rectangles between the centimeter decimal point and the originally entered number. The template is removed and the first entered decimal point is erased leaving the converted number or 3500 centimeters.

The preferred embodiment of the instant invention can also be used to convert square meters, for instance assume one wished to convert 4512.3 square decimeters to square hectometers. The user would place the decimal point in the center row in the deci column and enter the digits from decimal point to the left in the normal fashion so that the number 12 would appear in the deci column and the number 45 in the unit column. The three would be placed in the first square of the centi column so that if the template were removed the figure read would be 4512.3 decimeters. Next, a decimal place is entered in the circle in the hecto column and circles are entered in the rectangular openings between the decimal point and the number. The template is removed and the original decimal point erased leaving a resultant number in hectometers.

The top horizontal row of the instant invention is used to convert cubic meters. For instance, let us assume one wishes to convert 6253.45 cubic milimeters to cubic centimeters. A decimal point is placed in the milli column for millimeters and the number 6253 entered in the four openings to the left of the decimal point and the number 45 is placed in the two openings to the right of the decimal point. If the template were now removed, the number remaining on the sheet underneath would be 6253.45 cubic millimeters. However, to convert to centimeters a decimal point is placed in the centi column. No empty spaces exist between the new decimal point and the existing number so the template is simply removed and the old decimal point is erased leaving the original number converted to cubic centimeters.

To utilize the device to add mixed numbers, each number is entered in the proper columns sequentially, for instance:

Assuming one wishes to add 32.5 cubic centimeters, 0.981 cubic meters and 101.3 cubic millimeters, they would proceed as follows. The first number, 32.5 cubic centimeters would be entered by placing the decimal point in the centi column and 32 to the left of the decimal point and a 5 to the right. The number is then converted to the units in which the answer is desired in a manner similar to that previously described. The template is now slid down one line. Alignment must be maintained and is provided by placing the two previously entered decimal points in the alignment holes which are one space above the decimal point holes in the meter horizontal row. After moving the template, the second number is entered in the same manner as the first number was entered, that is 0.981 cubic meters would be entered by placing a decimal point in the unit column and the number 981 in the deci column. A new decimal point is now placed in the proper column for the conversion and the template is slid down one space utilizing the previously entered decimal points as alignment guides as previously described. The third number is now entered by placing a decimal point in the milli column with 101 in the rectangular openings to the left of the decimal point and 3 in the rectangular opening immediately to the right of the decimal point. A new decimal point is entered for the conversion and the columns may now be added with the resultant in the desired units.

Substraction may be carried out with the aid of the instant invention in a manner exactly identical to that utilized for addition. The only difference being the final mathematical operation would be substraction rather than addition.

From the preceding description of the apparatus, it is apparent that there are many arrangements which will operate in accordance with the general principles set forth. Therefore, the scope of the appended claims should not be limited to the specific embodiments disclosed by way of explanation in this specification.

What I claim as a new and useful contribution to the art and desire to protect by letters patent is:

1. A template comprising:

a substrate;

a plurality of indicia designating sequential metric units and defining a plurality of columns on said substrate, said metric units including the following in the indicated sequence, mega $10^6$, $10^5$, $10^4$. kilo $10^3$, hecto $10^2$, deka $10^1$, unit $10^0$, deci $10^{-1}$, centi $10^{-2}$, milli $10^{-3}$, $10^{-4}$, $10^{-5}$, and micron $10^{-6}$, and said first row is annotated, liter, gram, meter, said second row is annotated square meter, and said third row is annotated cubic meter;

a plurality of substantially circular first aperture means in said substrate for writing a single dot therethrough positioned at the right edge of each of said column;

a plurality of substantially rectangular second aperture means in said substrate positioned to the left of said first aperture means in said columns for writing a single digit therethrough;

said first and second aperture means forming a first horizontal row of alternate second and first aperture means;

a plurality of third apertures in said substrate dimensioned similar to said first aperture means and positioned above each of said first aperture means;

a plurality of fourth apertures in said substrate positioned at the left of each of said third apertures and dimensioned similar to said second aperture means;

a plurality of fifth apertures in said substrate positioned to the left of said fourth apertures in said columns and dimensioned similar to said fourth apertures forming a second row of alternately fifth, fourth and third apertures;

a plurality of sixth apertures in said substrate dimensioned similar to said first aperture means and positioned in vertical alignment with said first aperture means and third apertures;

a plurality of seventh and eighth apertures in said substrate positioned to the left of said sixth apertures in vertical alignment with said fourth and fifth apertures respectively and dimensioned similar to said fourth and fifth apertures; and a plurality of ninth apertures in said substrate dimensioned similar to and positioned to the left of said eighth apertures forming a third row of alternate ninth, eighth, seventh and sixth apertures.

2. An apparatus as defined in claim 1 further including a plurality of tenth apertures positioned in vertical alignment with said first aperture means, third and sixth apertures forming a fourth row of apertures.

3. An apparatus as defined in claim 1 wherein said substrate is formed from transparent plastic.

* * * * *